United States Patent [19]

Onishi

[11] 4,061,424
[45] Dec. 6, 1977

[54] PHOTOGRAPHIC ENLARGER WITH MEANS FOR TRIMMING

[75] Inventor: Tetsuo Onishi, Wakayama, Japan

[73] Assignee: Noritsu Koki Co., Ltd., Wakayama, Japan

[21] Appl. No.: 675,220

[22] Filed: Apr. 8, 1976

[30] Foreign Application Priority Data

Apr. 25, 1975 Japan .................................. 50-50407

[51] Int. Cl.² .......................................... G03B 27/52
[52] U.S. Cl. ......................................... 355/63; 355/75
[58] Field of Search ....................... 355/63, 53, 54, 75, 355/46, 61, 18, 62

[56] References Cited

U.S. PATENT DOCUMENTS

| 1,170,028 | 2/1916 | Webster | 355/63 |
| 1,787,662 | 1/1931 | Boedicker | 355/63 X |
| 2,607,265 | 8/1952 | Petrucelli | 355/63 |
| 3,752,578 | 8/1973 | Allan | 355/63 |
| 3,992,097 | 11/1976 | Jensen | 355/61 X |

Primary Examiner—Richard A. Wintercorn
Attorney, Agent, or Firm—Lane, Aitken, Dunner & Ziems

[57] ABSTRACT

The disclosed photographic enlarger has a vertically movable head portion which includes a housing for a light source and a mounting for a negative which can be moved together in a horizontal plane by virtue of being suspended from a pair of carriage members which move horizontally, in linear paths, at right angles to each other.

5 Claims, 3 Drawing Figures

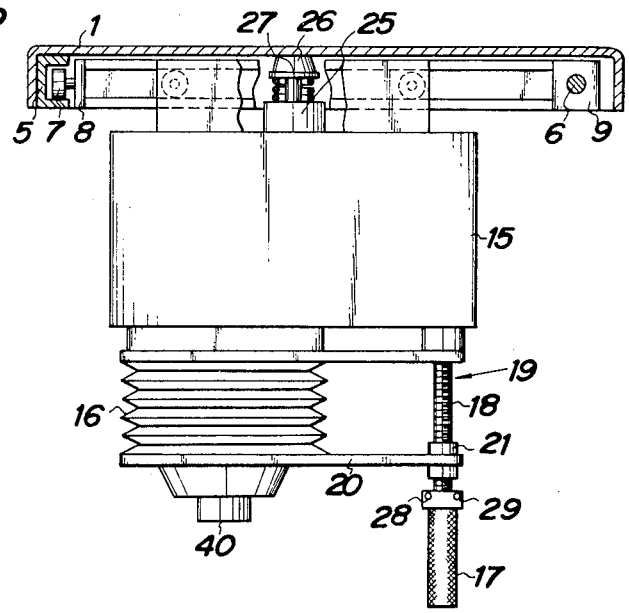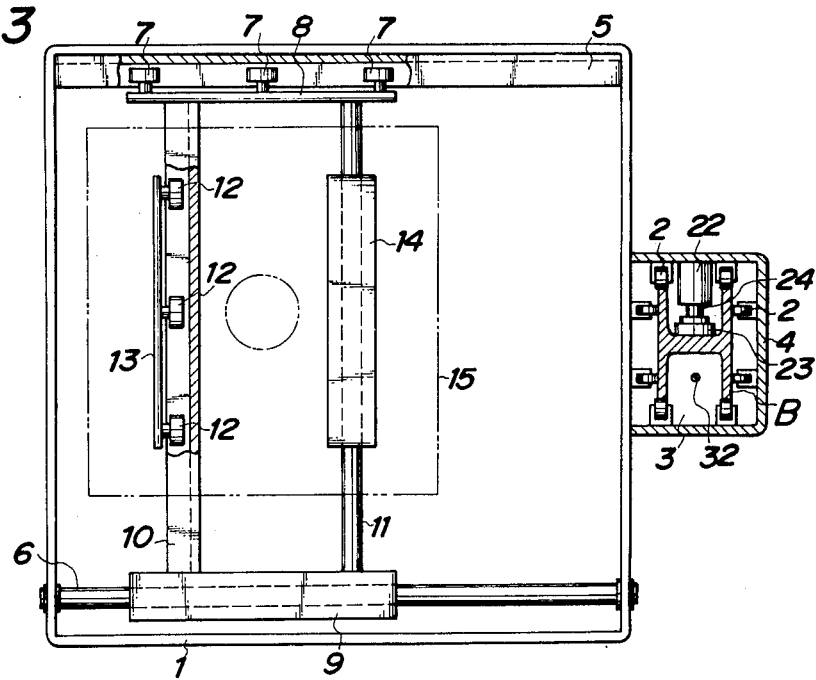

PHOTOGRAPHIC ENLARGER WITH MEANS FOR TRIMMING

BACKGROUND OF THE INVENTION

The present invention relates to an improved enlarger for enlargement and printing of a photographic negative, and more particularly to an enlarger adapted for trimming by movement of the negative, as contrasted with the prior art trimming apparatus which requires movement of the photographic paper.

In general, when an object or scene is photographed it will not appear in the exact center of the film. Even with a good photo, shot with best composition, a photo having its object slightly displaced from center may be desired. In all such cases an operation called trimming is required.

With the prior art enlarger, when trimming is required, the operation is accompanied exclusively by movement of the photographic paper. In the prior art trimming method, particularly when photographic papers in rolled form are used, operation of the mechanism holding the rolled paper, the feed mechanism and the various associated components becomes complicated.

SUMMARY OF THE INVENTION

The present invention provides a photographic enlarger having provision for trimmming without requiring movement of the photosensitive paper. The enlarger includes a vertically moveable head portion including a frame from which is suspended a first carriage member which, in turn, supports a second suspended carriage member. Each carriage member is adapted to move linearly in a horizontal plane in a path of travel at a right angle to the travel of the other. The second carriage member carries a housing for a light source, a mounting for a photographic negative, a projection lens and a focus adjustment.

Accordingly, the present invention provides for trimming by enabling the mounted negative to be moved at will, not only vertically, but also in any direction in the horizontal plane.

Accordingly, it is an object of the present invention to provide for trimming, i.e. positioning of an image on the photosensitive paper, without movement of the photosensitive paper.

Other objects of the present invention will become apparent to those skilled in the art from a reading of the detailed description of the preferred embodiment to follow, taken in conjunction with the appended drawing.

DESCRIPTION OF THE DRAWINGS

In the drawings are shown the major features of the present invention and features which are conventional and well known to those skilled in the art have been omitted. In the drawings:

FIG. 2 is a front elevational view, partially in cross-section, of the trimming means of the enlarger of FIG. 1; and FIG. 3 is a bottom view of the support frame for the trimming means.

DESCRIPTION OF THE PREFERRED EMBODIMENT

Figure 1:
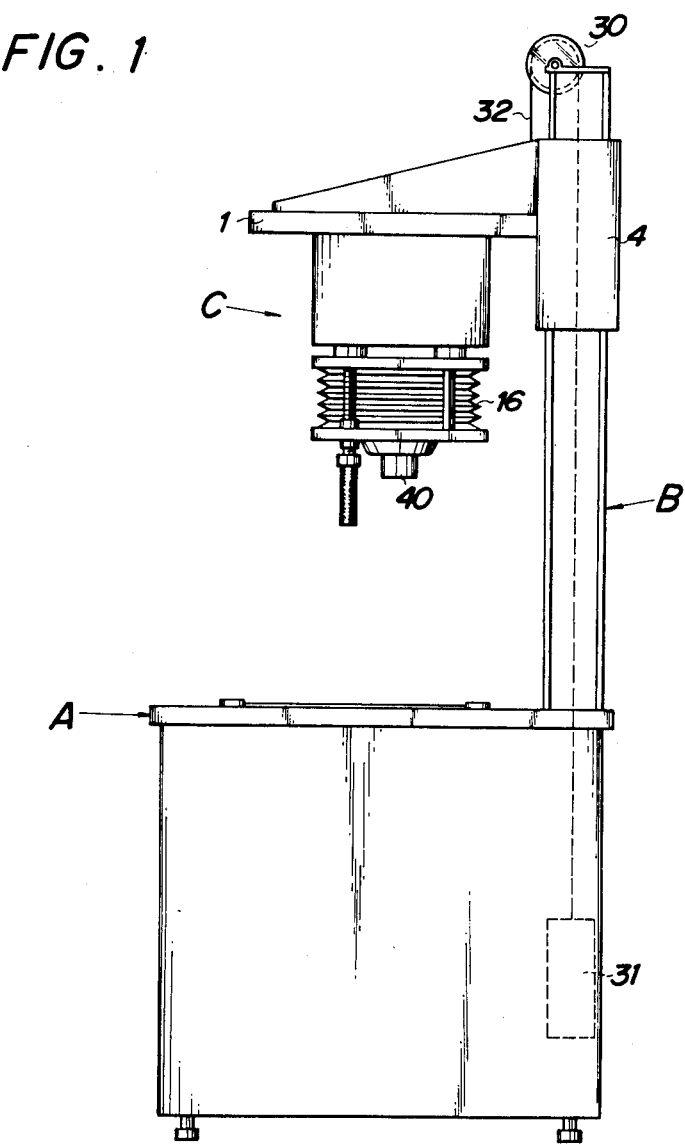
FIG. 1 is a side elevational view of an enlarger of the present invention.

An enlarger is shown in the drawings as having an easel A, a vertical guide support column B and a vertically movable head C which moves up and down along the guide support B. C includes a trimming device illustrated in FIGS. 2 and 3, a bellows for focusing 16 and a projection lens 40.

Thus the easel designated A in FIG. 1 is provided with, at one side with a roll of unexposed photosensitive paper (not shown) and at the other side with a take-up device (not shown) for taking up the paper from beneath the mask provided on the surface of the easel A. Guide support B has a H-shape cross-section and provides a slidable mounting for the enlarger head C which is free to move up and down in order to set the degree of enlargement.

The enlarger head C includes a trimming support frame 1 and, at the rear thereof, a vertical open cylinder or bracket 4 integral with the frame 1 and which carries a number of guide rollers 2 for engaging the guide support column B on which the cylinder or bracket 4 is mounted. The frame 1 serves to support a first carriage member formed of a channel piece 10 and a rod member 11 mounted in parallel between a support plate 8 and a slidably mounted cylinder or bushing 9. Cylinder 9 slides along a rod member 6 rigidly mounted to the frame 1. The opposite end of the first carriage member formed by the plate 8 carries three roller members 7 which are mounted in the channel of the [-shaped guide rail 5. Thus the first carriage member is free to traverse guide rail 5 and rod 6 back and forth, to the left and right in FIG. 3. The first carriage member, in turn, carries a second carrage member on which is mounted the lamp house 15, bellows 16, etc. The second carriage is mounted for horizontal movement perpendicular to the line of travel of the first carriage, in a fashion similar to the manner in which the first carriage is mounted for movement relative to the frame member 1. Specifically, a support plate 13 is rigidly affixed to the top of the lamp house 15 and carries three roller members 12 which are mounted within the channel of the [-shaped guide rail 10 of the first carriage member. A second support member is rigidly affixed to the top of the lamp house 15 in the form of a casing or cylinder 13 which is slidably mounted on the rod member 11 of the first carriage member.

The lamp house 15 houses a light source and opens, at its lower surface, into the focusing device or bellows 16 which, in turn, is provided with a projection lens 40 and means for mounting a photograhic negative (not shown).

The lowermost point of extension of the bellows 16 is set by the position of the support member 20 to which the lowermost end of te bellows is affixed. Positioning of the support member 20, i.e. focusing, is provided for by a threaded bar 18 on which the support member 20 is mounted. The upper end of the threaded rod 18 is rotatably mounted in a boss provided on the lamp house 15. A threaded boss 21 provided at one end of the support member 20 is mounted on rod 18 and can be caused to move up or down along the threaded rod 18 by rotation of the handle 17. Handle 17 is provided with push-buttons 28 and 29, push-botton 28 operating the solenoid 22 mounted within the bracket member 4. Solenoid 22 can be operated to extend the iron core 24 which carries a frictional member 23 which, in turn, presses against the support column B. Push-botton 29 likewise operates a solenoid 25 (shown in FIG. 2) to extend and iron core 27 which also carries a frictional member 26 toward locking engagement with the surface of the frame member 1.

As best seen in FIG. 1, the enlarger head C is counter-weighted to facilitate upward movement along support column B. The counter-weight 31 is carried by a wire 32 looped over pulley member 30 mounted on the upper end of the support column B.

In operation, the push-button 28 is operated to disengage the support column B, and the enlarger head C is moved vertically to set it in the desired position, i.e. to provide the desired degree of enlargment.

Then the light source is turned on, the button 29 is operated and the lamp house 15 is moved in the horizontal plane as required to effect to trimming operation, handle 17 is rotated to provide a focus setting, and thereafter the light source is turned off. After these operations a photographic paper is set on the easel station A and the light source is turned on to provide an exposure. Since the exposure operation is almost identical to that of the prior art, a detailed description has been omitted.

As apparent from above description, in accordance with the present invention, a relatively small-size light trimming means is provided which may easily be operated by one hand.

The invention may be embodied in other specific forms without departing from its spirit or essential characteristics. The above-described embodiment is, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:
1. A photographic enlarger comprising:
   a generally horizontally-disposed easel for mounting a photosensitive paper;
   a vertical column stationarily disposed with respect to said easel;
   a generally horizontally-disposed frame member, slidably mounted on said vertical column for vertical movement up and down said vertical column;
   a first carriage assembly slidably supported by said frame member for linear movement, in a horizontal plane, relative to said frame; and
   a second carriage assembly supported by said first carriage assembly and slidably mounted for linear movement in a horizontal plane, at a right angle to the path of linear movement of said first carrriage assembly, said second carriage assembly supporting a housing for a light source, means for mounting a photographic negative, a projection lens and means for focusing an image projected through said lens onto the photosensitive paper.

2. The photographic enlarger of claim 1 wherein said focusing means comprises:
   a bellows member, the upper end of which opens into the housing for said light source and the lower end of which opens to the projection lens and is affixed to one end of a support member, the opposite end of said support member having an integral threaded ferrule; and
   a threaded rod member extending through said ferrule and rotatably affixed at one end to the housing for the light source, so that by rotation of said threaded rod the support member affixed to the lower end of the bellows can be moved vertically up or down.

3. The photographic enlarger of claim 1, wherein said first carriage assembly includes a pair of substantially parallel members, one of said members slidably supported on said frame member by a plurality of rollers.

4. The photographic enlarger of claim 1, wherein said second carriage assembly includes a pair a substantially parallel members, one of said members slidably supported on said first carriage assembly by a plurality of rollers.

5. The photographic enlarger of claim 1, further comprising positioning control means for said frame member and for said housing, said control means including stop means for maintaining a selected vertical position for said frame member, and a selected position for said housing.

* * * * *